358-86. OR 3,497,612 SR
CONTROL MEANS FOR CABLE TELEVISION
Filed June 9, 1967
T 5002
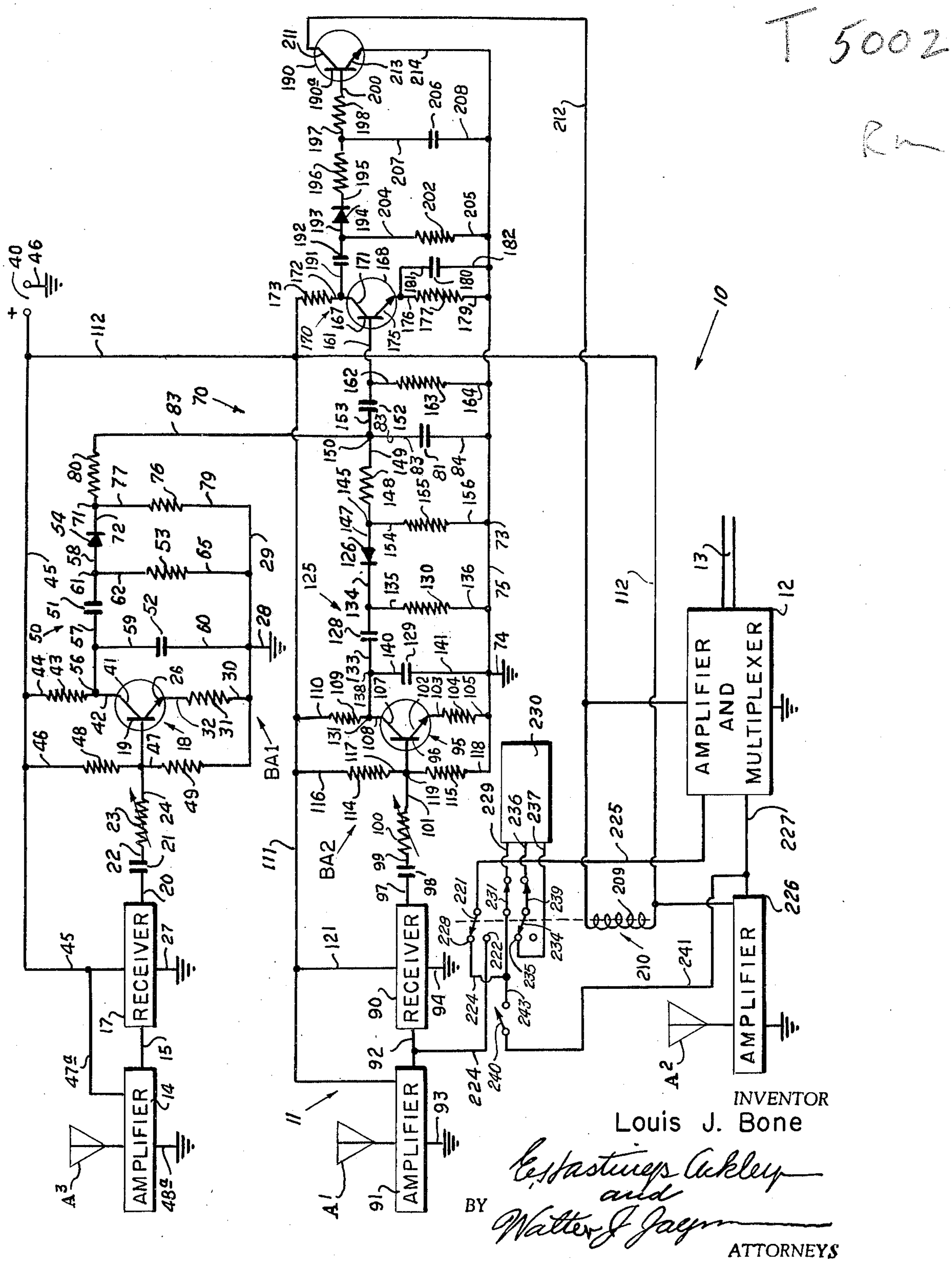
INVENTOR
Louis J. Bone
BY Estastings Ackley and Walter J. Jagm
ATTORNEYS United States Patent Office
3,497,612
Patented Feb. 24, 1970

3,497,612
CONTROL MEANS FOR CABLE TELEVISION

Louis J. Bone, 404 W. Pidcake, Gatesville, Tex. 76528

Filed June 9, 1967, Ser. No. 644,836
Int. Cl. H04n *7/00*
U.S. Cl. 178—6 16 Claims

ABSTRACT OF THE DISCLOSURE

A control means for a cable television system for preventing transmission of a television program over the output cable of the system if a local broadcasting station is broadcasting the same program at that time.

This invention relates to control means and more particularly to a control circuit responsive to two different variable signals for controlling operation of a controlled device.

An object of the invention is to provide a new and improved control circuit responsive to electric signals from two different sources for controlling operation of a control device when the signals of the two sources are the same.

Another object is to provide a control circuit wherein the controlled device is operated by the control means only if the signals from the two different sources remain the same for a predetermined short period of time to prevent accidental operation of the controlled means by extraneous interference signals.

A main object of the invention is to provide a control circuit for a cable television system such as a community antenna television system for preventing transmission of a program being received from one broadcasting station to the subscribers of the system if a second broadcasting station is simultaneously broadcasting the same program.

Another object is to provide a control circuit wherein preselected components of two television program signals from two different sources, such as a local television broadcasting station and a remote broadcasting station, are compared to determine if the same program is being broadcast by both stations, the control circuit controlling operation of a controlled means, such as a relay, to prevent transmission of a program through the system if the same program is being broadcast by the local station.

Still another object is to provide a control circuit for a cable television system which has means for preventing momentary or transient electrical disturbances from preventing proper operation of the control circuit.

A further object is to provide a control circuit having receivers to which the outputs of a local and a remote television station are transmitted which detect the audio FM signal components of the broadcasting television signals and means operatively associated with each of the receivers for rectifying a narrow frequency range of the audio signals of the receivers which are then compared by a suitable signal comparison and control means which controls operation of a relay and which prevents transmission of a program broadcast by the remote station to the system cable if the programs being broadcast by both stations are the same.

A still further object is to provide a control circuit of the type described wherein the control means include an amplifier which provides a fluctuating direct current signal if the two programs differ and which provides a substantially constant or zero output if the two programs being broadcast are different.

A still further object is to provide a control circuit of the type described wherein the control means includes a control transistor whose operation is responsive to the signal from the amplifier and which is energized whenever the output of the amplifier is fluctuating to cause energization of a relay means.

A still further object is to provide a control circuit of the type described wherein the relay means causes an alternate television program signal to be transmitted to the subscribers of the system in place of the program whose transmission is being prevented.

Additional objects and advantages of the invention will be readily apparent from the reading of the following description of a device constructed in accordance with the invention, and reference to the accompanying drawings thereof, wherein:

The single figure of the drawing is a schematic illustration of the circuit of a control circuit embodying the invention.

Referring now to the drawing, the control circuit 10 embodying the invention is shown in use with a community antenna television system 11 which has a means, such as the antennas A1 and A2, for picking up television program signals from one or more different distant television broadcasting stations and transmits such signals through the usual amplifier and multiplexer 12 to a cable 13. The television signals are transmitted over different frequency channels to the output cable so that the subscribers having conventional television receivers connected to the cable may select which channels are to be received on their sets. For example, the antenna A1 may receive Channel 4, television signals from one remote broadcasting station and the antenna A2 may receive Channel 8 television signals from another remote broadcasting station so that each subscriber may watch a program by tuning his receiver to either Channel 4 or Channel 8.

The control circuit 10 is used to prevent the transmission of a program being picked up by the antenna A1 to the cable 13 if a local broadcasting station of the community, whose television signals may be picked up by an antenna A3, is broadcasting the same program in order to comply with government regulations which require that a community antenna television system not provide to its subscribers a program at the same time it is being broadcast by a local station which serves the same community.

Usually the antenna A1 picks up the television signals which are received from a remote broadcasting station which belongs to the same national broadcasting system as the local station and there is, therefore, likelihood that these two stations will transmit the same program at the same time.

The FM audio signal component of the television signals broadcast by the local station picked up by the antenna A3 is amplified by the usual preamplifier 14 and transmitted by a conductor 15 to an FM audio receiver 17 which converts the frequency modulated audio signals it receives to the usual audio signals which are in the form of a voltage. The audio signal output of the receiver is applied across the base emitter circuit of a transistor 18 of a band pass amplifier BA1, one side of the output circuit of the receiver being connected to the base 19 of the transistor 18 through a conductor 20, a blocking capacitor 21, a conductor 22, a variable resistance 23 and a conductor 24, and the other side of the output circuit of the receiver being connected to the emitter 26 of the transistor through the conductor 27, ground, the conductors 28, 29 and 30, a resistance 31 and a conductor 32. The emitter collector circuit of the transistor is connected across a power input circuit 40 of direct current voltage, its collector 41 being connected to the positive side of the input circuit through a conductors 42, a resistance 43 and conductors 44 and 45, while its emitter is connected to the other side of the power input circuit through the conductor 32, the resistance 31, the conductors 30, 29 and 28, ground and a conductor 46. A biasing potential is applied to the base 19 of the transistor by means of a voltage divider which includes a pair of resistances 48 and 49 connected in series across the input circuit 40 by means of the conductors 45, 46, 47, 29 and 28, ground and the conductor 46.

The power input circuit may be used as the power source for the receiver 17 and the preamplifier 14, the receiver being connected across the power input circuit by means of the conductors 45 and 27, ground and the conductor 46 and the amplifier being connected thereacross by the conductors 45, 47*a* and 48*a*, ground and the conductor 46.

The output of the transistor 18 is transmitted across a filter network 50, which includes a pair of capacitors 51 and 52 and a resistance 53, to a semi-conductor or diode 54. One side of the diode is connected to the common juncture of connection 56 of the collector 41 and the resistance 43 by means of a conductor 57, the capacitor 51 and the conductor 58. The capacitor 52 is connected across the resistance 31 and the emitter collector circuit of the transistor, one side thereof being connected to the conductor 57 by the conductor 59 and its other side being connected to the conductor 29 by a conductor 60. The resistance 53 is connected between the common connection 61 of the other side of the capacitor 51 and the diode by means of a conductor 58. The other side of the resistance 53 is connected by a conductor 65 to the conductor 29.

The diode 54 transmits only the positive half cycles of the audio frequency output of the filter network of selected frequency band width to a comparison circuit 70. The diode connects one side of the network to one input side or terminal 71 of the comparison circuit by means of a conductor 72 and the other side of the network is connected to the other input terminal 73 of the comparison circuit through the conductors 29 and 28, ground and the conductors 74 and 75. The comparison circuit includes a resistance 76 connected between the input terminal 71 and ground by the conductors 77, 79 and 29 and a resistance 80 connected to one side of the capacitor 81 by a conductor 83. The other side of the capacitor is connected to the other input terminal 73 by the conductor 84 and 75. The input terminal 73 is connected to ground by the conductors 74 and 75.

It will be apparent that as the conductivity of the emitter-collector circuit of the transmitter 18 varies in accordance with the audio signals transmitted thereto from the receiver 17, a selected frequency range or band of the signals, predetermined by the filter network, is transmitted to the diode 54 and the positive half-cycles of these audio-signals transmitted through the diode 54 are applied across the input terminals 71 and 73 of the comparison circuit.

The television signals picked up by the antenna A1 are transmitted to one side of the input circuit of an FM audio receiver 90 through the usual preamplifier 91 and a conductor 92, the other side of the amplifier output circuit and the other side of the receiver input circuit being connected to ground through the conductors 93 and 94, respectively. The audio output of the receiver 90 is applied across the base-emitter circuit of a transistor 95 of a band pass amplifier BA2 one side of the receiver output circuit being connected to its base 96 by means of a conductor 97, a blocking capacitor 98, a conductor 99, a variable resistance 100 and a conductor 101 while the other side of the receiver output circuit is connected to the emitter 102 by means of a conductor 103, a resistance 104, the conductors 105, 75 and 74, ground and the conductor 94. The emitter-collector circuit of the transistor is also connected across the power input circuit 40, its collector 107 being connected to the positive side of the input circuit means of the conductor 108, a resistance 109 and the conductors 110, 111, and 112 and its emitter being connected to the other side of the power input circuit by means of the conductor 103, the resistance 104, the conductors 105, 75 and 74, ground and the conductor 46.

A biasing potential is applied to the base 96 of the transistor 81 of the transistor 95 by means of a voltage divider network which includes a pair of resistances 114 and 115 connected in series across the input circuit by means of the conductors 112, 111, 116, 117, 118, 75 and 74, ground and the conductor 46. The base 96 is connected to the common conneciton 119 of the resistance and of the conductors 101 and 117.

Power may be supplied to the power input circuits of the amplifier 91 and the receiver 90 from the power input circuit 40, the receiver power input circuit being connected across the power input circuit by means of the conductors 45, 112, 111, 121 and 94, ground and the conductor 46, and the amplifier power input circuit being connected thereacross by the conductors 45, 112, 111 and 93, ground and the conductor 46.

The output of the transistor 95 is applied across the terminals 145 and 73 of the comparison circuit 70 through a filter network 125 and a half-wave rectifier or diode 126. The filter network includes a pair of capacitors 128 and 129 and a resistance 130. One side of the capacitor 128 is connected to the common juncture or connection 131 of the collector 107 and the resistance 109 by means of the conductor 133 while its other side is connected to ground by the conductors 134 and 135, the resistance 130 and the conductors 136, 75 and 74. The capacitor 129 is connected to the common connection 138 of the capacitor 128 and the collector 107 by means of the conductors 140 and 133 while its other side is connected to ground by the conductors 141, 75 and 74.

The output of the filter network 125 is applied across the input terminals 145 and 73 of the comparison circuit through the diode 126, the diode being connected by a conductor 147 to the input terminal 145. The conductor 147 also connects the diode to one side of a resistance 148 whose other side is connected by the conductors 149 and 83 to one side of the capacitor 81. The other side of the capacitor 81 is connected to ground through the conductors 84, 75 and 74. The common connection 150 of the conductors 83 and 149 is connected to one side of a blocking capacitor 152 by a conductor 153. The terminal 145, and therefore, the common connection of the diode and the resistance 148, is connected to ground through a conductor 154, a resistance 155, and the conductors 156, 75 and 74.

It will be apparent that as the conductivity of the emitter-collector circuit of the transistor 95 varies in accordance with the audio signals transmitted thereto from the receiver 90, the filter network 125 transmits the audio frequency output of the transistor 95, to the diode 126 which then transmits the negative half-cycles of such audio signals in such frequency band.

The filter networks 50 and 125 both permit only the same frequency range or band of audio signals to be transmitted therethrough to their associate diodes 54 and 126, respectively.

If it is assumed that the same television program is being picked up by the antennas A1 and A3 and the variable resistances 23 and 100 are properly adjusted, since the same frequency ranges or bands of the audio signals of the television signals being received by both antennas A3 and A1, the signals being applied across the terminals 71 and 73 of the comparison circuit are positive going signals and the signals applied across the terminals 145 and 73 are negative going signals and the potential at the common connection 150 of the resistances 80 and 148 of the comparison circuit will be constant and the half wave signals of opposite polarities applied to the comparison circuit through the diodes 54 and 126 will cancel each other.

If the antennas A1 and A3, however, are picking up different television programs, the audio signal outputs of the receivers 17 and 90 will not be identical and as a result the potential at the common connection 150 will vary.

The side of the capacitor 152 not connected to the common connection 150 is connected to ground by means of the conductors 161 and 162, the resistance 163 and the conductors 164, 75 and 74. The conductor 161 is also connected to the base 167 of a transistor 168 of an amplifier 170. The emitter-collector circuit of the transistor 168 is connected across the power input circuit 40, its collector 171 being connected to the positive side of the input circuit by a conductor 172, a resistance 173, and the conductors 111, 112 and 45 and its emitter 175 being connected to the other side of the input circuit through the conductor 176, the resistance 177, the conductors 179, 75 and 74, ground and the conductor 46. A capacitor 180 is connected across the resistance 177 by means of the conductors 176, 181, 182 and 75.

The output of the amplifier 170 controls the operation of the relay control transistor 190 whose base **190*a* is connected to the common connection of the collector 171 and the resistance 173 by a conductor 191, a blocking capacitor 192, a conductor 193, a diode 194, a conductor 195, a resistance 196, a conductor 197, a resistance 198 and the conductor 200. A resistance 202 is connected between the common connection of the capacitor 192 and the diode 194 by the conductors 193, 204, 205 and 75. The diode permits only the positive going pulses of the output of the transistor 168 to be transmitted to the base 190*a*, and to one side of a capacitor 206. The potential applied to the base varies in accordance with the charge on the capacitor 206, one side of which is connected to the common connection of the resistances 196 and 198 by the conductors 197 and 207 and whose other side is connected to ground through the conductors 208, 75 and 74. The emitter-collector circuit of the control transistor 190 is connected across the power input circuit 40 in series with the winding 210 of a relay 209, its collector 211 being connected to the positive side of the input circuit through a conductor 212, the relay winding 209 and the conductors 112 and 45, and its emitter 213 being connected to the other side of the input circuit through the conductors 214, 75, 74, ground and the conductor 46**.

The emitter-collector circuit of the power transistor 190 is conductive when a varying potential is applied across the base emitter circuit of the transistor 168 of the amplifier during a period of time of sufficiently long duration that the capacitor 206 is charged by the positive pulses transmitted thereto through the diode 194 to a value sufficiently high that the control transistor is rendered conductive. The control transistor is rendered nonconductive if the conductivity of the emitter-collector circuit of the transistor 168 remains substantially constant or is rendered non-conductive so that no positive going pulses are transmitted through the diode 194 to charge and maintain the capacitor 206 charged to the potential at which the transistor 190 is rendered and maintained conductive since the charge on the condenser 206 will drain or leak off through the resistance 198 and the base emitter circuit of the transistor 190.

The relay 210 includes a movable contact 221 which when the relay winding 209 is energized engages the stationary contact 222 of the relay to transmit the television signals picked up the antenna A1 to the amplifier and multiplexer 12 of the community antenna system, the output conductor 92 of the pre-amplifier 93 then being connected through the conductor 224 and the relay contacts 222 and 221 to one input line 225 of the multiplexer. The television signals received by the antenna A2 from a second remote television broadcast station are transmitted through its amplifier 226 to another input line 227 of the multiplexer. As a result, the cable 13 of the community antenna system will have applied thereto, in the usual well known manner by the multiplexer the television signals picked up by the antennas A1 and A2 and carried on two different television frequency channels, for example, Channels 4 and 8, respectively, and the subscribers to the system may then select the program carried on either Channel 4 or 8 by means of the usual tuning means of their television receiver sets.

The relay contact 221 when the relay winding 209 is not energized, is in its upper position and engages the stationary relay contact 228 and connects the multiplexer input line 225 to the output line 229 of a transcriber or program reproducer 230 such as a magnetic tape playback device, to cause a prerecorded television program to be transmitted to the multiplexer over its input line 225 instead of the program which is being picked up by the antenna A1. A manual switch 231 is connected in the line 229 for a purpose to be described below.

The relay winding 210 may also include a second movable contact 234 which, when the relay winding 209 is not energized, engages the stationary contact 235 to connect the conductors 236 and 237 of the transcriber to connect a control circuit of the transcriber which then places the transcriber in operation. A manually operable switch 239 connected in the line 237 may be employed to render the transcriber inoperable for a purpose to be described below.

If it is desired, in the event that the same program is being picked up simultaneously by the two antennas A1 and A3, that the television program being picked up by the antenna A2 be transmitted not only to the input line 227 of the multiplexer but also to its other input line 225 so that the same program will be transmitted on both channels 4 and 8 over the cable 13, the manual switches 231 and 237 are opened and a manual switch 240 is closed so that when the relay contact 221 is in its upper position, the input line 225 is connected to the input line 227 through a conductor 241, the switch 240, the conductors 242, 243, and 244 and the contact 221.

In use, assuming now that the local station of the community, whose television signals are transmitted on television Channel 5 and are picked up by the antenna A3, is an affiliate of the same national broadcasting system, for example, CBS, as the remote station whose signals are transmitted on Channel 4 being picked up by the antenna A1 so that at least occasionally the same program will be broadcast at the same time by both the local station and such remote station and that, if the same program is being so transmitted by these two stations, it is desired that a prerecorded program be transmitted over the cable on Channel 4 instead of the program being picked up by the antenna A1, the manual switches 231 and 235 are closed and the switch 240 is opened. It is assumed for purposes of illustration that the remote broadcasting station whose signals are being picked up by the antenna A2 is affiliated with another national broadcasting system, for example, NBC, so that it will not broadcast the same programs as the local station and that its programs are transmitted over television channel 8.

If the programs now being picked up by the antennas A1 and A3 are different, the audio signal outputs of the two receivers 17 and 90 will be different both in amplitude and phase and a varying net or resultant potential will be applied across the common connection 150 and the conductor 75 and thus across the base emitter circuit of the transistor 168. As the conductivity of the emitter collector circuit of the transistor 168 varies, the charge on the capacitor 205 increases to a value sufficiently high that the emitter collector circuit of the transistor 190 is maintained conductive. As a result, the relay winding 209 is energized and the television programs on Channels 4 and 8 picked up by the antennas A1 and A2 will be transmitted by the amplifier multiplexer 12 to the cable 13 over the Channels 4 and 8 so that the subscribers connected to the cable then choose either the program being carried on Channel 4 or on Channel 8.

If sometime during the period of broadcasting by the local station and the remote station whose signals are picked up by the antenna A1, both stations begin to broadcast simultaneously the same program, as in the case where the program is provided simultaneously to both such stations, the potential applied across the base emitter circuit of the transistor 168 will remain constant or substantially constant since the rectified half-wave audio signals from the filter networks 50 and 125 transmitted to the comparison circuit through the anodes 54 and 126 are opposite in polarity and substantially equal in amplitude and cancel out. The emitter-collector circuit of the transistor 168 will thus be rendered non-conductive or its conductivity will remain substantially constant.

Since no positive going pulses are now being transmitted through the anode 194, or any such pulses so transmitted are of very low amplitude, the charge across the capacitor 206 will leak off through the resistance 198 and the base emitter circuit of the transistor 190 a short predetermined period of time, for example, 5 seconds, after the transitors 168 is rendered non-conductive or its conductivity is maintained substantially constant, and the potential across the capacitor drops to a value sufficient low that the emitter-collector circuit of the transistor 190 is rendered non-conductive. The relay winding 200 will be de-energized and its contacts 221 and 234 will move to their upper positions. This movement of the contact 234 will cause the transcriber to commence operation and the prerecorded program will be then transmitted from the transcriber to the multiplexer input line 225 and thus over Channel 4 on the cable 13 as the contact 221 connects the output line 229 of the transcriber to the input line 225 of the multiplexer. It will be appreciated that the values of the variable resistances 23 and 100 are adjusted as required to assure that whenever the same program is being picked up simultaneously by the antennas A1 and A3, the audio signals applied across the comparison circuit cancel or substantially cancel each other.

If a transcriber 230 is not used or if no such prerecorded program is available, the switch 240 may be closed and the switches 239 and 231 may be opened so that in the event the local station broadcasts the same program as the program being picked up by the antenna A1, the program being picked up by the antenna A2 is transmitted by the multiplexer to the cable 13.

It will be apparent that if the community antenna television system is provided with a control circuit 10, it is not necessary to determine in advance what programs are to be carried by the stations whose signals are being received by the antennas A1 and A3 since the control circuit will automatically prevent transmission of the program being picked up by the antenna A1 if the same program is being broadcast simultaneously by the local station and is being picked up by the receiver A3. It will also be apparent that the control circuit 10 operates automatically and does not require the presence of an operator.

It will further be seen that, if desired, a similar control circuit may be used which would be responsive to the signal being picked up by such antenna A3 to prevent transmission of the program being picked up by the antenna A2 to the input line 227 of the amplifier and multiplexer 12 if the local station were also broadcasting the same program.

It will also be seen that a simple automatically operating control means has been illustrated and described for preventing the transmittal of a television program over the cable of a community antenna system in the event that a local broadcasting station is simultaneously transmitting the same program of the system.

It will further be seen that the control circuit permits the substitution of another program to the cable of the system so that each channel of the system normally carrying a program will not be rendered inoperative but will carry a different program and the subscriber will be able to receive programs on all normally operative channels.

It will now be seen that the control circuit compares only preselected identical components of the television signals being broadcast by two different television stations, such as narrow frequency bands of the audio signals to control the operation of a relay means, and that the control means which may include the time delay or transient compensating or suppressing circuit which includes the capacitor 206 and the transistor 190, prevents momentary extraneous interferences or disturbances or momentary fading of the signals received from one or the other of the stations from causing improper operation of the control circuit.

It will further be seen that while the illustrated and described control means utilizes FM audio signal components of the television signals being broadcast by the two stations, other components of such broadcast television signals, such as the video signals, may also be used for this purpose, in which case the receivers 90 and 17 would be the usual video receiver circuits of the usual television receiver sets and the preselected frequency bands of the outputs of the receiver circuits would then be transmitted through suitable amplifiers, filter networks, and half-wave rectifiers in the same manner illustrated in connection with the control circuit which utilizes the audio components of the television signals for this purpose.

It will also be seen that while the control circuit embodying the invention has been illustrated and described as being employed to prevent a community antenna television system from transmitting a television program to the output cable of the system if the same program is being broadcast simultaneously by a local broadcasting station of the community, the control circuit may be used in other cable television systems to prevent simultaneous transmission of the same program to the output cable over two different channels of such system whatever the sources of the television signals. For example, the control system could be employed to prevent the transmission of the same program to the output cable 13 picked up by the antennas A1 and A2 from the two different remote broadcasting systems by using the control circuit.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A control circuit for a community cable television system serving a community having a local television broadcasting station, the system having at least one antenna for picking up television signals from a remote television broadcasting station and amplifying and transmitting the signals from the antenna to a cable by means of which the television signals are transmitted to subscribers to the system, said control circuit including: first means for detecting and comparing selected components of the television signals broadcast by the local station and by the remote station; and second means operatively associated with said first means for preventing transmission of the television signals from the antenna to the cable when the local and remote stations are broadcasting the same program.

2. The control circuit of claim 1, and third means operatively associated with said second means for causing a different program to be transmitted to the cable of the system when transmission of the television signals from the antenna is prevented by said second means.

3. The control circuit of claim 3, wherein said third means includes means for transmitting a prerecorded television program to said cable when the local and remote stations are broadcasting the same program.

4. The control circuit of claim 2, wherein said third means includes means for transmitting the signals to the cable from a second antenna of the system which picks up television signals from a second remote television broadcasting station when the first mentioned remote station and the local station are broadcasting the same program.

5. The control circuit of claim 1, wherein said selected components are predetermined frequency bands of the audio signals of the television signals broadcast by the local and remote stations.

6. The control circuit of claim 5, wherein said first means comprises comparison means for comparing said predetermined frequency bands of the audio signals and providing a control signal to cause operation of said second means when the audio signals in said predetermined frequency band broadcast by the two stations are the same.

7. The control circuit of claim 4, and means operatively associated with said second means for preventing operation of said second means for a short predetermined period of time after the two stations commence broadcast of the same program.

8. A control circuit for a community antenna television system serving a community having a local television broadcasting station, the system having at least one antenna for picking up television signals from a remote television broadcasting station and transmitting the signals from the antenna to a cable by means of which the television signals are transmitted to subscribers of the system, said control circuit including: first receiver means for detecting the audio signal component of the television signals broadcast by the local stations; second receiver means for detecting the audio signal component of the television signal broadcast by the remote broadcasting station; a comparison circuit; means operatively associated with each of said receiver means for transmitting a preselected frequency band of the audio signal outputs of said receivers to said comparison circuit; and control means responsive to the output of said comparison circuit for controlling transmission of the television signals picked up by the antenna of the system for preventing such transmission when the two stations are simultaneously broadcasting the same program.

9. The control circuit of claim 8 wherein said control means includes a relay having a winding; a control device for energizing said relay; and means responsive to the output of said comparison circuit for causing said control device to actuate said relay to prevent transmission of the television signal from the antenna to the cable a predetermined period of time after the output of said comparison circuit decreases below a predetermined value.

10. A control circuit for a cable television system having means for transmitting television signals from two different sources to an output cable of the system; said control circuit including: first means for detecting and comparing selected components of the television signals from the two sources; and second means operatively associated with said first means for preventing transmission of the television signals from one of the sources to the output cable when the two sources are transmitting the same program simultaneously.

11. The control circuit of claim 10 and third means operatively associated wtih said second means for causing a different program to be transmitted to the cable of the system when transmission of the television signals from said one of said sources is prevented by said second means.

12. The control circuit of claim 11, wherein said third means includes means for transmitting a prerecorded television program to said cable when the two sources are transmitting the same program.

13. The control circuit of claim 10, wherein said third means includes means for transmitting the signals to the cable from a third source of television signals when said two sources are transmitting the same program.

14. The control circuit of claim 10 wherein said selected components are predetermined frequency bands of the audio signals of the television signals being transmitted from said sources.

15. The control circuit of claim 14, wherein said first means comprises comparison means for comparing said predetermined frequency bands of the audio signals and providing a control signal to cause operation of said second means when the audio signals in said predetermined frequency band transmitted by the two sources are the same.

16. The control circuit of claim 13, and means operatively associated with said second means for preventing operation of said second means for a short predetermined period of time after the two sources commence transmission of the same program.

References Cited

UNITED STATES PATENTS

| | | | |
|---|---|---|---|
| 2,181,564 | 11/1939 | Goldsmith | 178—6 |
| 2,854,506 | 9/1958 | Picklbs | 178—6 |
| 3,333,198 | 7/1967 | Mandbll et al. | 178—6 |

ROBERT L. GRIFFIN, Primary Examiner

B. L. LEIBOWITZ, Assistant Examiner

U.S. Cl. X.R.

325—308.0